United States Patent Office 3,792,159

Patented Feb. 12, 1974

1

3,792,159
PROCESS FOR PREPARING INJECTIONABLE COMPOSITIONS

Geoffrey Green, Worthing, Brian George Coverell, North Holmwood, and Anthony Michael Pratt, Worthing, England, assignors to Beecham Group Limited, Brentford, Middlesex, England No Drawing. Filed July 10, 1972, Ser. No. 270,086
Claims priority, application Great Britain, July 13, 1971, 32,780/71
Int. Cl. A61k *23/00*
U.S. Cl. 424—91 6 Claims

ABSTRACT OF THE DISCLOSURE

This invention is concerned with a process for preparing finely divided micro-particles of tyrosine having an allergen dispersed therein. The micro-particles prepared according to the invention may be suspended in a physiologically acceptable liquid carrier to produce an injectionable composition suitable for use in the desensitization of individuals who are sensitive to the allergen.

In British patent specification No. 1,155,036 there is described and claimed a therapeutic composition injection comprising finely divided solid microparticles of a metabolizable substance having an active drug physically incorporated into the structure of said microparticles, said microparticles being suspended in a physiologically acceptable or non-toxic liquid carrier. The process described in said specification comprises dissolving the metabolizable substance in hot water or neutral salt solutions, adding the active drug and isolating the precipitate formed on cooling. Compositions such as described in said specification are especially useful when the active drug is an allergen, since in such cases the injectionable composition can be used in desensitization therapy with less risk of adverse side reactions. For this purpose a particularly useful metabolizable substance is tyrosine, but we have found that with tyrosine, and active allergens, the process described in British specification No. 1,155,036 is far from satisfactory. Firstly, since tyrosine is only soluble in hot water to a very small extent (0.244 g./100 ml. at 75° C.), the very large and cumbersome volumes of material make the process difficult. Secondly, with the known process, control of the size of the precipitated microparticles is very difficult, involving among other things a controlled degree of supercooling. Since the microparticles are for injection, it is clear that the presence of even one large crystal of tyrosine in the micro-fine precipitate is unacceptable, since the hypodermic needle would be blocked during the giving of the injection.

This invention is based on the discovery of a process by which these disadvantages of the known process are substantially overcome.

According to the present invention there is provided a process for preparing finey divided microparticles of tyrosine having an allergen dispersed therein, which process comprises mixing a solution of tyrosine in a strong aqueous acid with an aqueous or water miscible solution of the desired allergen and simultaneously or subsequently neutralizing the resultant solution, thereby precipitating the required finely divided microparticles of tyrosine containing the allergen. Preferably the pH of the reaction medium is not allowed to rise above pH 7 for any substantial length of time during the process of this invention, since the degree of binding of allergen by the tyrosine decreases if precipitation occurs at higher pH's.

As used in the specification "neutralization" is to be

2 understood as adjustment of pH to between about 4 and 7.

The strong acid which is employed in this process is usually an inorganic acid. Hydrochloric acid is preferred since it is normally present in biological fluids, but nitric and sulphuric acids could be used. Phosphoric acid, although useable, is a much poorer solvent and is therefore not recommended. The molar quantity of acid required varies with its concentration. For example with a concentration range 3.0 to 3.5 N HCl, a quantity of about 0.00924 mole will suffice to dissolve 1 g. of tyrosine, but at lower concentrations greater amounts are required. Normal trial and error will generally be sufficient to determine the requisite amount of any particular acid.

The solution of allergen, which is added to the tyrosine solution may be in an entirely aqueous medium or in a medium containing one or more water miscible solvents for example, glycerol.

The base used to neutralize the solution of tyrosine and allergen is usually sodium hydroxide, for reasons of economy and convenience, but the identity of the base does not appear to be critical. More important than the identity of the base is the necessity to ensure that at no time, or at least for no prolonged time during the neutralization, does the solution rise appreciably above pH 7. This condition can be met by vigorous stirring of the solution and by the use only of the required amount of base (i.e. avoiding an excess of base over the amount theoretically necessary to neutralize the strong acid). If desired, various buffering agents can be incorporated in the neutralizing base to assist in pH control. We find that the final pH of the neutralized solution should preferably be between pH 4 and pH 6.

If the pH conditions are met, the bulk of the micro-fine precipitate of tyrosine containing the allergen will precipitate from the neutralized solution immediately, and is preferably completed by standing for a period, of from a few hours to a day or two. The fineness of the precipitate can be controlled to some extent by varying the rate of neutralization and the degree of agitation of the solution during neutralization. Generally, the faster the neutralization is carried out and the more vigorously the solution is stirred, the finer the precipitate obtained.

The allergen solution which is mixed with the tyrosine solution in the present process is prepared by known procedures. Allergenic extracts of whole allergens such as pollens, house dust, cat fur, dog hair, and the like are well known in desensitization therapy. It should, however, be noted that some allergens are acid-sensitive, and when such allergens are to be subjected to the present process, special care is needed to ensure that the allergen is not subjected to extreme acid conditions. This may be achieved by method exemplified in Example 4 below, where the solution of allergen and a solution of the neutralizing agent are added separately to the acidic solution of tyrosine with rigorous pH control.

The product of the present process is a micro-fine precipitate of tyrosine containing the allergen. This may be removed from the solution by centrifugation or filtration, washed e.g. with phenol-saline, and finally resuspended in a liquid physiologically-acceptable carrier such as phenol saline, to produce an injectable composition suitable for use in desensitization therapy.

The following examples illustrate the present invention:

EXAMPLE 1

DL-tyrosine (1 g.) is dissolved in dilute hydrochloric acid. The molar quantity of acid required varies with its concentration. Within the concentration range 3–3.5 N HCl a quantity of 0.00924 mole of HCl suffices, but at lower concentrations, greater amounts are required. An extract of mixed grass pollens, which may be in an entirely aqueous medium, or in a medium containing glycerol or other water-miscible solvents, is then added (e.g. 3.33 ml. of an extract containing 60,000 Noon units/ml., which has been prepared by extraction of mixed grass pollens with a mixture of sodium chloride 3000 g., liquefied phenol B.P. 295 ml., distilled water 24.1 and glycerin B.P. 23 l.). Before addition to the tyrosine solution, the pollen extract is diluted with sufficient water to give a total volume when added to the tyrosine solution of 10.76 ml. Immediately, afterwards N NaOH (equivalent to the HCl originally used: e.g. 9.24 ml. in the example quoted) is run in as rapidly as possible with cooling and with vigorous stirring. The final pH should be on the acid side of neutrality, and preferably between 4 and 6. The suspension is preferably allowed to stand for a period of from 1 to 24 hours, and then centrifuged. The precipitate is washed repeatedly with phenol-saline solution, and finally resuspended to a convenient concentration, for instance, 50 mg./ml. of tyrosine.

EXAMPLE 2

L-tyrosine (947.5 g.) was dissolved in 3.5 N hydrochloric acid (2.5 l.), and the solution was sterile filtered. A 20% w./v. extract of house dust in Evan's solution was dialysed and concentrated to two-fifteenths of its initial volume, and the concentrate was sterile filtered. 2.4 l. of the tyrosine solution was mixed with 3 l. of the house dust solution. The combined solutions was vigorously stirred under sterile conditions, and a solution of sodium phosphate in shodium hydroxide ($NaH_2PO_4 \cdot 2H_2O$ 1,000 g., N NaOH to 10 l.) was run in until a pH of 5.0 was attained. The suspension was allowed to stand for 24 hours, then centrifuged, washed repeatedly in phenol-saline, and finally resuspended in the same medium to a volume of 6 l.

EXAMPLE 3

L-tyrosine (300 g.) was dissolved in 800 ml. of 3.5 N hydrochloric acid. 800 ml. of this sterile filtered solution was mixed with 1000 ml. of a sterile 6% extract of mixed grass pollens, which had been extracted with the glycerol medium described in Example 1, and 1500 ml. of sterile distilled water. The stirred mixture was treated with sodium phosphate solution as described in Example 2. After standing for 24 hours, the suspension was centrifuged, washed repeatedly with phenol saline, and resuspended in the same medium.

EXAMPLE 4

1000 ml. of a sterile-filtered 6% extract of mixed grass pollens, prepared in aqueous glycerol medium as described in Example 1, was mixed with 1500 ml. of sterile distilled water. The solution was stirred vigorously, and 800 ml. of tyrosine solution, prepared as in Example 3, and sodium phosphate solution, prepared as in Example 2, were run in separately under control of a pH-stat so that the pH of the stirred mixture was maintained at 5.0 and did not exceed the limits of pH 4–6. When all the tyrosine solution had been added, the suspension was allowed to stand for 24 hours, centrifuged, washed repeatedly with phenol-saline, and finally resuspended in the same medium.

What is claimed is:

1. A process for preparing finely divided micro-particles of tyrosine having an allergen dispersed therein, wherein the unacceptable presence of even one large crystal of tyrosine in said micro-particles for injection would block the hypodermic needle during the injection, which process improvement consists essentially of the steps of eliminating the step of supercooling by mixing a solution of tyrosine in a strong aqueous acid with an aqueous or water miscible solution of the desired allergen and simultaneously or subsequently neutralizing by adjustment, with vigorous stirring, of pH to between 4 and 7 with no more than the required amount of base, the resultant solution thereby precipitating the required finely divided micro-particles of tyrosine containing the allergen and without involving a controlled degree of supercooling to control the size of the precipitated micro-particles, and wherein in said process improvement, the fineness of the precipitate can be controlled by varying the rate of neutralization and the degree of agitation of the solution during neutralization, the finer precipitates being obtained by the fastest neutralization and the more vigorous stirring.

2. A process as claimed in claim 1 wherein the said strong aqueous acid is hydrochloric acid.

3. A process as claimed in claim 1 wherein the solution of tyrosine and allergen is neutralized using sodium hydroxide.

4. A process as claimed in claim 1 wherein the allergen is present in a solution in aqueous glycerol.

5. Finely divided micro-particles of tyrosine having an allergen dispersed therein, whenever prepared by a process as claimed in claim 1.

6. A process as claimed in claim 1 wherein the pH is adjusted to between pH 4 and pH 6.

References Cited

UNITED STATES PATENTS 3,541,201 11/1970 Brown ........... 424—91 X

SHEP K. ROSE, Primary Examiner